(12) United States Patent
Hasser (10) Patent No.: US 6,833,846 B2
(45) Date of Patent: Dec. 21, 2004

(54) CONTROL METHODS FOR THE REDUCTION OF LIMIT CYCLE OSCILLATIONS FOR HAPTIC DEVICES WITH DISPLACEMENT QUANTIZATION

(75) Inventor: Christopher J. Hasser, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 151 days.

(21) Appl. No.: 10/279,260

(22) Filed: Oct. 23, 2002

(65) Prior Publication Data

US 2003/0076297 A1 Apr. 24, 2003

Related U.S. Application Data

(60) Provisional application No. 60/334,905, filed on Oct. 24, 2001.

(51) Int. Cl.[7] .................................................. G09G 5/00
(52) U.S. Cl. ........................ 345/701; 345/157; 345/702; 463/38
(58) Field of Search ................................. 345/156, 157, 345/161, 163, 701, 702; 463/37, 38; 273/148 B (56) References Cited

U.S. PATENT DOCUMENTS

| | | |
|---|---|---|
| 3,157,853 A | 11/1964 | Hirsch |
| 3,220,121 A | 11/1965 | Cutler |
| 3,497,668 A | 2/1970 | Hirsch |
| 3,517,446 A | 6/1970 | Corlyon et al. |
| 3,902,687 A | 9/1975 | Hightower |
| 3,903,614 A | 9/1975 | Diamond et al. |
| 4,160,508 A | 7/1979 | Frosch et al. |
| 4,236,325 A | 12/1980 | Hall et al. |
| 4,513,235 A | 4/1985 | Acklam et al. |
| 4,581,491 A | 4/1986 | Boothroyd |
| 4,599,070 A | 7/1986 | Hladky et al. |
| 4,708,656 A | 11/1987 | de Vries et al. |
| 4,713,007 A | 12/1987 | Alban |
| 4,891,764 A | 1/1990 | McIntosh |
| 4,930,770 A | 6/1990 | Baker |
| 4,934,694 A | 6/1990 | McIntosh |
| 5,019,761 A | 5/1991 | Kraft |
| 5,022,407 A | 6/1991 | Horch et al. |
| 5,035,242 A | 7/1991 | Franklin |

(List continued on next page.)

FOREIGN PATENT DOCUMENTS

| | | |
|---|---|---|
| EP | 0349086 | 1/1990 |
| JP | 01-003664 | 7/1990 |
| JP | 02-109714 | 1/1992 |
| JP | 04-007371 | 8/1993 |
| JP | 05-193862 | 1/1995 |

OTHER PUBLICATIONS

Adelstein, "A Virtual Environment System For The Study of Human Arm Tremor," Ph.D. Dissertation, Dept. of Mechanical Engineering, MIT, Jun. 1989.

(List continued on next page.)

*Primary Examiner*—Kent Chang
(74) *Attorney, Agent, or Firm*—Kilpatrick Stockton LLP (57) ABSTRACT

Systems and methods for reducing limit cycle oscillations of a haptic device. A net force applied to the device is a combination of a primary force computed in a main haptic loop and a secondary force computed in a damping loop that cancels or minimizes the oscillations. Various algorithms for computing the secondary force are provided. In one algorithm, the secondary force is determined from the momentum error associated with crossing of a wall position by the manipulandum and is applied immediately after the crossing is detected. In another algorithm, a periodically varying secondary force with a phase shift relative to the phase of the oscillating manipulandum is computed.

30 Claims, 9 Drawing Sheets

U.S. PATENT DOCUMENTS

| | | |
|---|---|---|
| 5,038,089 A | 8/1991 | Szakaly |
| 5,078,152 A | 1/1992 | Bond |
| 5,186,695 A | 2/1993 | Mangseth et al. |
| 5,212,473 A | 5/1993 | Louis |
| 5,240,417 A | 8/1993 | Smithson et al. |
| 5,271,290 A | 12/1993 | Fischer |
| 5,275,174 A | 1/1994 | Cook |
| 5,299,810 A | 4/1994 | Pierce |
| 5,309,140 A | 5/1994 | Everett |
| 5,334,027 A | 8/1994 | Wherlock |
| 5,466,213 A | 11/1995 | Hogan |
| 5,547,382 A | 8/1996 | Yamasaki |
| 5,721,566 A | 2/1998 | Rosenberg et al. |
| 5,739,811 A | 4/1998 | Rosenberg et al. |
| 5,766,016 A | 6/1998 | Sinclair |
| 5,785,630 A | 7/1998 | Bobick et al. |
| 6,059,506 A | 5/2000 | Kramer |
| 6,111,577 A | 8/2000 | Zilles et al. |
| 6,219,034 B1 | 4/2001 | Elbing et al. |
| 6,253,612 B1 * | 7/2001 | Lemkin et al. .......... 73/504.02 |
| 6,271,828 B1 | 8/2001 | Rosenberg et al. |
| 6,292,174 B1 | 9/2001 | Mallett et al. |
| 6,300,937 B1 | 10/2001 | Rosenberg |
| 6,342,880 B2 * | 1/2002 | Rosenberg et al. ......... 345/161 |
| 6,366,272 B1 | 4/2002 | Rosenberg et al. |
| 6,422,941 B1 | 7/2002 | Thorner et al. |
| 6,486,872 B2 | 11/2002 | Rosenberg et al. |
| 6,563,487 B2 * | 5/2003 | Martin et al. ................ 345/156 |
| 6,686,911 B1 * | 2/2004 | Levin et al. ................ 345/184 |

OTHER PUBLICATIONS

Adelstein, "Design and Implementation of a Force Reflecting Manipulandum for Manual Control research," DSC–vol. 42, Advances in Robotics, Edited by H. Kazerooni, pp. 1–12, 1992.

Aukstakalnis et al., "Silicon Mirage: The Art and Science of Virtual Reality," ISBN 0–938151–82–7, pp. 129–180, 1992.

Baigrie, "Electric Control Loading—A Low Cost, High Performance Alternative," Proceedings, pp. 247–254, Nov. 6–8, 1990.

Bejczy et al., "Kinesthetic Coupling Between Operator and Remote Manipulator," International Computer Technology Conference, The American Society of Mechanical Engineers, San Francisco, CA, Aug. 12–15, 1980.

Bejczy, "Sensors, Controls, and Man–Machine Interface for Advanced Teleoperation," Science, vol. 208, No. 4450, pp. 1327–1335, 1980.

Bejczy, "Generalization of Bilateral Force–Reflecting Control of Manipulators," Proceedings Of Fourth CISM–IFToMM, Sep. 8–12, 1981.

Bejczy, et al., "Universal Computer Control System (UUCCS) For Space Telerobots," CH2413–3/87/0000/0318501.00 1987 IEEE, 1987.

Bejczy et al., "A Laboratory Breadboard System For Dual–Arm Teleoperation," SOAR '89 Workshop, JSC, Houston, TX, Jul. 25–27, 1989.

Brooks et al., "Hand Controllers for Teleoperation—A State–of–the–Art Technology Survey and Evaluation," JPL Publication 85–11; NASA–CR–175890; N85–28559, pp. 1–84, Mar. 1, 1985.

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25–44, May 2, 1993.

Caldwell et al., "Enhanced Tactile Feedback (Tele–Taction) Using a Multi–Functional Sensory System," 1050–4729/93, pp. 955–960, 1993.

Colgate, et al., "Implementation of Stiff Virtual Walls in Force–Reflecting Interfaces," Department of Mechanical Engineering, Northwestern University, Evanston, IL, pp. 1–7, Sep. 22, 1993.

"Cyberman Technical Specification", Logitech Cyberman Swift Supplement, Apr. 5, 1994.

Eberhardt et al., "OMAR—A Haptic display for speech perception by deaf and deaf–blind individuals," IEEE Virtual Reality Annual International Symposium, Seattle, WA, Sep. 18–22, 1993.

Eberhardt et al., "Including Dynamic Haptic Perception by The Hand: System Description and Some Results," DSC–vol. 55–1, Dynamic Systems and Control: Vol. 1, ASME 1994.

Gobel et al., "Tactile Feedback Applied to Computer Mice," International Journal of Human–Computer Interaction, vol. 7, No. 1, pp. 1–24, 1995.

Gotow et al., "Controlled Impedance Test Apparatus for Studying Human Interpretation of Kinesthetic Feedback," WA11–11:00, pp. 332–337.

Howe, "A Force–Reflecting Teleoperated Hand System for the Study of Tactile Sensing in Precision Manipulation," Proceedings of the 1992, IEEE International Conference on Robotics and Automation, Nice, France, May 1992.

IBM Technical Disclosure Bullein, "Mouse Ball–Actuating Device With Force and Tactile Feedback," vol. 32, No. 9B, Feb. 1990.

IWATA, "Pen–based Haptic Virtual Environment," 0–7803–1363–1/93 IEEE, pp. 287–292, 1993.

Jacobsen et al., "High Performance, Dextrous Telerobotic Manipulator With Force Reflection", Intervention/ROV '91 Conference & Exposition, Hollywood, Florida, May 21–23, 1991.

Jones et al., "A perceptual analysis of stiffness," ISSN 0014–4819 Springer International (Springer–Verlag); Experimental Brain Research, vol. 79, No. 1, pp. 150–156, 1990.

Kaczmarek et al., "Tactile Displays," Virtual Environment Technologies.

Kontarinis et al., "Display of High–Frequency Tactile Information to Teleoperators," Telemanipulator Technology and Space Telerobotics, Won S. Kim, Editor, Proc. SPIE vol. 2057, pp. 40–50, Sep. 7–9, 1993.

Marcus, "Touch Feedback in Surgery," Proceedings of Virtual Reality and Medicine the Cutting Edge, Sep. 8–11, 1994.

McAffee, "Teleoperator Subsystem/Telerobot Demonsdtrator: Force Reflecting Hand Controller Equipment Manual," JPL D–5172, pp. 1–50, A1–A36, B1–B5, C1–C36, Jan. 1988.

Minsky, "Computational Haptics: The Sandpaper System for Synthesizing Texture for a Force–Feedback Display," Ph.D. Dissertation, MIT, Jun. 1995.

Ouh, Young, "Force Display in Molecular Docking," Order No. 9034744, p. 1–369, 1990.

Ouh–Young, "A Low–Cost Force Feedback Joystick and Its Use in PC Video Games," IEEE Transactions on Consumer Electronics, vol. 41, No. 3, Aug. 1995.

Ouhyoung et al., "The Development of A Low–Cost Force Feedback Joystick and its Use in the Virtual Reality Environment," Proceedings of the Third Pacific Conference on Computer Graphics and Applications, Pacific Graphics '95, Seoul, Korea, Aug. 21–24, 1995.

Patrick et al., "Design and Testing of A Non–reactive, Fingertip, Tactile Display for Interaction with Remote Environments," Cooperative Intelligent Robotics in Space, Rui J. de Figueiredo et al., Editor, Proc. SPIE vol. 1387, pp. 215–222, 1990.

Pimentel et al., "Virtual Reality: through the new looking glass," $2^{nd}$ Edition: McGraw–Hill, ISBN 0–07–050167–X, pp. 41–202, 1994.

Rabinowitz et al., "Multidimensional tactile displays: Identification of vibratory intensity, frequency, and contactor area," Journal of The Acoustical Society of America, vol. 82, No. 4, Oct. 1987.

Russo, "The Design and Implementation of a Three Degree of Freedom Force Output Joystick," MIT Libraries Archives Aug. 14, 1990, pp. 1–131, May 1990.

Russo, "Controlling Dissipative Magnetic Particle Brakes in Force Reflective Devices," DSC–vol. 42, Advances in Robotics, pp. 63–70, ASME 1992.

Scannell, "Taking a Joystick Ride," Computer Currents, Boston Edition, vol. 9, No. 11, Nov. 1994.

Shimoga, "Finger Force and Touch Feedback Issues in Dexterous Telemanipulation," Proceedings of Fourth Annual Conference on Intelligent Robotic Systems for Space Expploration, Renssealer Polytechnic Institute, Sep. 30,–Oct. 1, 1992.

Snow et al., "Model–X Force–Reflecting–Hand–Controller," NT Control No. MPO–17851; JPL Case No. 5348, pp. 1–4, Jun. 15, 1989.

Stanley et al., "Computer Simulation of Interacting Dynamic Mechanical Systems Using Distributed Memory Parallel Processors," DSC–Vol. 42, Advances in Robotics, pp. 55–61, ASME 1992.

Tadros, "Control System Design for a Three Degree of Freedom Virtual Environment Simulator Using Motor/ Brake Pair Actuators", MIT Archive ©Massachusetts Institute of Technology, pp. 1–88, Feb. 1990.

Terry et al., "Tactile Feedback In A Computer Mouse," Proceedings of Fouteenth Annual Northeast Bioengineering Conference, University of New Hampshire, Mar. 10–11, 1988.

PCT Search Report, corresponding to PCT/US02/34453, mailed on Oct. 24, 2002.

* cited by examiner

CONTROL METHODS FOR THE REDUCTION OF LIMIT CYCLE OSCILLATIONS FOR HAPTIC DEVICES WITH DISPLACEMENT QUANTIZATION

CROSS-REFERENCES TO RELATED APPLICATIONS

This application claims the benefit of U.S. Provisional Application No. 60/334,905, filed Oct. 24, 2001, entitled "Control Methods for the Reduction of Limit Cycle Oscillations for Haptic Devices with Displacement Quantization," which disclosure is incorporated herein by reference for all purposes.

STATEMENT AS TO RIGHTS TO INVENTIONS MADE UNDER FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. 0091589 awarded by the National Science Foundation.

BACKGROUND OF THE INVENTION

The present invention relates generally to control devices with haptic feedback and in particular to systems and methods for reducing limit cycle oscillations that occur in such devices in the presence of displacement quantization.

Haptic feedback, which includes tactile and impulse sensations, has been implemented in user-manipulable control devices such as knobs, joysticks, game controllers, and so on. Control devices with haptic feedback provide various force and/or tactile sensations in response to user manipulation of the controls. These sensations can include vibrations of the housing of the control device and/or vibrations or other forces exerted on the knob, joystick, or other user manipulable control (generally referred to as a manipulandum) to resist or accelerate motion of the manipulandum. Haptic feedback can enhance realism in simulations or enhance a user's ability to control an object.

Haptic feedback sensations in a control device are commonly generated by including in the device one or more actuators that can produce forces on the housing the manipulandum. The actuators can be controlled by a processor located either in the device itself or in a remote host with which the device communicates. In some such devices, the processor is provided with haptic parameters for computing forces to be applied to the device and for converting those forces to actuator signals, and the manipulandum is equipped with one or more position encoders that periodically report updated position data to the processor. The position data can be used in determining the force to be applied.

In general, the processor operates in a servo loop. In each servo cycle, the processor samples the position data provided by the encoder(s), computes the force to be applied using the position data and the haptic parameters, and generates a corresponding control signal. The actuator receives the signal and applies this force continuously until the next update. A servo rate of 1 kHz is typical.

One common haptic effect is simulation of contact with a wall, which may occur to indicate the end of a range of motion (e.g., of a volume control knob), an impact with a wall during motion of a simulated object (e.g., a simulated vehicle in a video game), or under various other conditions. For instance, in a system with one degree of freedom, if the coordinate x represents the manipulandum position, a wall can be located at a point $x=x_0$. In general, the stiffness of a wall is not infinite; the wall is modeled as a spring obeying Hooke's law. Thus, for a wall at $x=x_0$, the force on the manipulandum can be characterized as $F=0$ for $x \leq x_0$, and $F=K(x-x_0)$ for $x>x_0$, for some spring constant K. A large spring constant K corresponds to a stiffer wall and is generally desirable, although the stiffness of virtual walls is limited by various factors, such as the ability of actuators to generate large forces. For systems with more than one degree of freedom, planar or non-planar walls can also be modeled using similar principles.

Because the position of the manipulandum is sampled at discrete times, the wall force is generally not applied until after a user has moved the manipulandum some distance past the wall position (i.e., into the wall). Once applied, the wall force tends to push the manipulandum back through the wall position. This wall force is countered by the user's bias force against it, which pushes the manipulandum back toward and through the wall position. This can result in oscillations (referred to as "limit cycle oscillations" because the oscillation properties are largely independent of the initial conditions) around the wall position, with the knob moving a short distance back and forth. Such oscillations may be perceptible to the user as undesirable tactile vibrations of the manipulandum and/or as audible noise, depending on the frequency and amplitude of the oscillations. This effect can be exacerbated by the fact that most position encoders in common use are quantized, i.e., the encoder reports the manipulandum position as one of a number of discrete values ("counts"), while the actual position of the manipulandum is generally somewhere between two adjacent counts.

Several techniques for reducing limit cycle oscillations at wall contact have been proposed. One option is to use position encoders with higher resolution (i.e., shorter distance between counts). However, the cost of encoders increases with resolution, making such an option impractical in applications where cost is an important consideration.

Another option is to use more powerful processors that can operate at an increased servo rate, but this option is not always available. In some applications, the choice of processors is limited by cost, industry pre-qualification requirements, or other considerations, making it difficult to simply select a more powerful processor. Even when a faster processor is an option, increasing the sampling rate can cause the frequency of limit cycle oscillations to increase into a range where oscillations of a given amplitude are more perceptible to the user, thereby exacerbating the problem. Moreover, for a given encoder resolution, there is a point beyond which increasing the sampling rate has little effect on the limit cycle oscillations.

In addition to these hardware-based options, various control algorithms have been proposed to reduce limit cycle oscillations. For instance, in theory, the desired force can be computed by simulating system behavior one half of a servo cycle ahead of the current sampling time. This, however, requires accurate knowledge of both position and velocity of the manipulandum. In practice, during oscillations, knowledge of position is limited by the encoder resolution and reliable velocity measurements are unavailable because an oscillating manipulandum changes direction and speed too rapidly for existing systems to reliably measure its velocity. Thus, such control algorithms are generally difficult to implement.

It would be desirable to compute forces for a haptic manipulandum with displacement quantization in a manner that reduces limit cycle oscillations, without requiring an increase in the sampling rate or other constraints of a design.

BRIEF SUMMARY OF THE INVENTION

According to embodiments of the present invention, limit cycle oscillations of a haptic device can be reduced by applying a net force that combines a primary force computed by conventional methods in a main haptic loop and a secondary force computed so as to cancel or minimize the oscillations. The secondary force can be, e.g., an impulse force applied immediately after detecting that the manipulandum has passed through a wall position, or a periodically varying force with an appropriate phase shift relative to the (oscillating) manipulandum position. In one embodiment, the secondary force is computed using a damping circuit that operates in a damping loop with a higher updating rate than the main haptic loop.

The following detailed description together with the accompanying drawings will provide a better understanding of the nature and advantages of the present invention.

DETAILED DESCRIPTION OF THE INVENTION

According to embodiments of the present invention, a haptic force to be applied to an manipulandum is determined by combining a primary force that may be computed using conventional techniques and a secondary (e.g., damping) force computed according to a damping algorithm. The secondary force can be, e.g., an impulse force applied immediately after the manipulandum passes through the wall position, or a periodically varying force with an appropriate phase shift relative to the manipulandum position. In one implementation, the secondary force can be computed using a damping circuit that operates in a damping loop with a higher updating rate than the main haptic loop.

Figure 1:
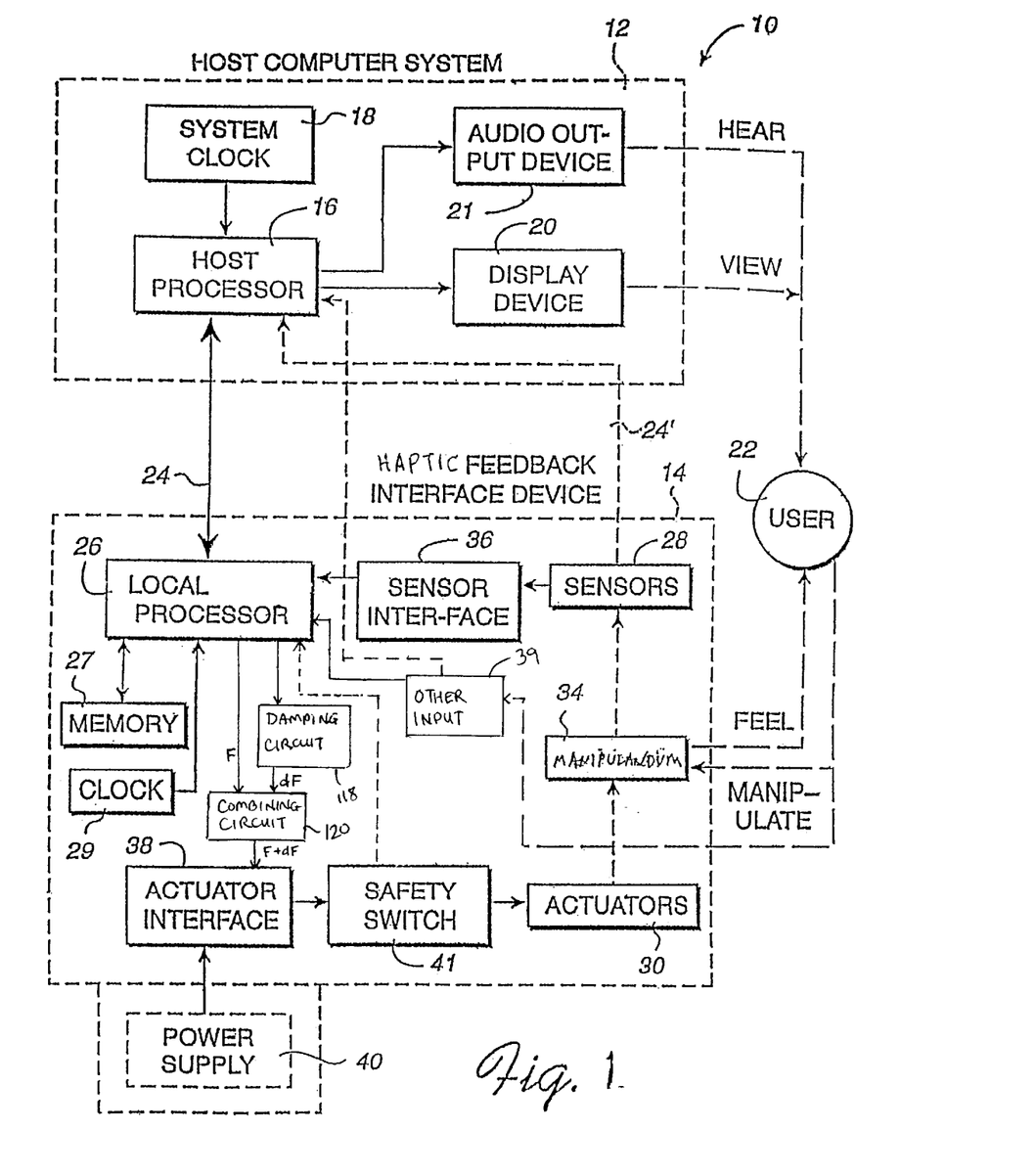
FIG. 1 is a simplified block diagram of a system including a haptic control device according to a first embodiment of the present invention.

FIG. 1 is a simplified block diagram of a first embodiment of an architecture for an interface system 10 including a haptic feedback interface device 14 according to the present invention. Haptic device 14 communicates with a host computer system 12. Host computer system 12 includes a host processor 16, a display device 20, and an audio output device 21. These components may be of conventional design.

Haptic device 14 includes a manipulandum 34, which may be any type of object that a user 22 may grasp and manipulate, such as a knob, slider, lever, joystick, pool cue, steering wheel, or other object. One or more sensors 28 (e.g., a position encoder) are provided to monitor the position of manipulandum 34 and report the current position to other components, such as a local processor 26, which can be, e.g., a microprocessor or other type of processor, via a sensor interface 36. One or more actuators 30 generate forces on manipulandum 34 that can be felt by user 22. Actuators 30, which may be of conventional design, may be implemented, e.g., using DC brush motors or the like, with the motor torque (and thus the generated force) being dependent on current pulses applied to the motor. In general, actuators 30 are controlled via an actuator interface 38 and powered by a power supply 40. A safety switch 41 may also be provided to disable actuators 30 when necessary. A detailed description of actuators 30, actuator interface 38, power supply 40, and safety switch 41 is omitted as not being critical to understanding the present invention.

The forces to be applied by actuators 30 are determined by local processor 26 in conjunction with a damping circuit 118 and a combining circuit 120. In this embodiment, local processor 26 receives from host computer system 12 information from which the forces to be applied by actuators 30 are determined. In some instances, local processor 26 may receive "low level" force commands from host 12, such as a value of a current to be supplied to one of actuators 30. In other instances, local processor 26 may receive "high level" force commands from host 12, such as an equation describing force as a function of manipulandum position (as determined by sensors 28), from which local processor 26 computes the force and determines the current to be applied. In some embodiments, local processor 26 may also receive other input 39 from user 22 that can be used to determine the force to be applied. Local processor 26 generates a first control signal (F) corresponding to the primary force to be applied to actuator 30. First control signal F is provided to combining circuit 120. In one embodiment, the control signal is made up of current pulses generated using a pulse width modulation (PWM) generator, but other types of control signals can be used instead.

Damping circuit 118 is used in accordance with the present invention to provide a secondary force on manipulandum 34 during contact with a virtual wall, thereby reducing the amplitude of limit cycle oscillations. Damping circuit 118 receives parameters characterizing the virtual wall from local processor 26 (e.g., wall position, spring constant K) and uses this information, together with a position signal from one or more of sensors 28, to compute a secondary force. Specific algorithms that may be implemented in damping circuit 118 to compute a secondary force are described below. Damping circuit 118 generates a second control signal (dF) representing the secondary force, which is provided to combining circuit 120. In one embodiment, the control signal is made up of current pulses generated using a PWM generator, but other types of control signals can be used instead.

Combining circuit 120 combines the damping-force control signal dF from damping circuit 118 with the primary force control signal F from local processor 26 and provides a signal representing the combined force to actuator interface 38. In one implementation, combining circuit 120 simply adds current pulses received from local processor 26 and damping circuit 118. In another embodiment, the control signals provided by local processor 26 and damping circuit 118 are the values of the respective forces; combining circuit 120 adds the forces (algebraically) and generates a corresponding control signal. It will be appreciated that the implementation of combining circuit 120 can be varied depending on the implementation of the secondary force and main force control signals.

Figure 2:
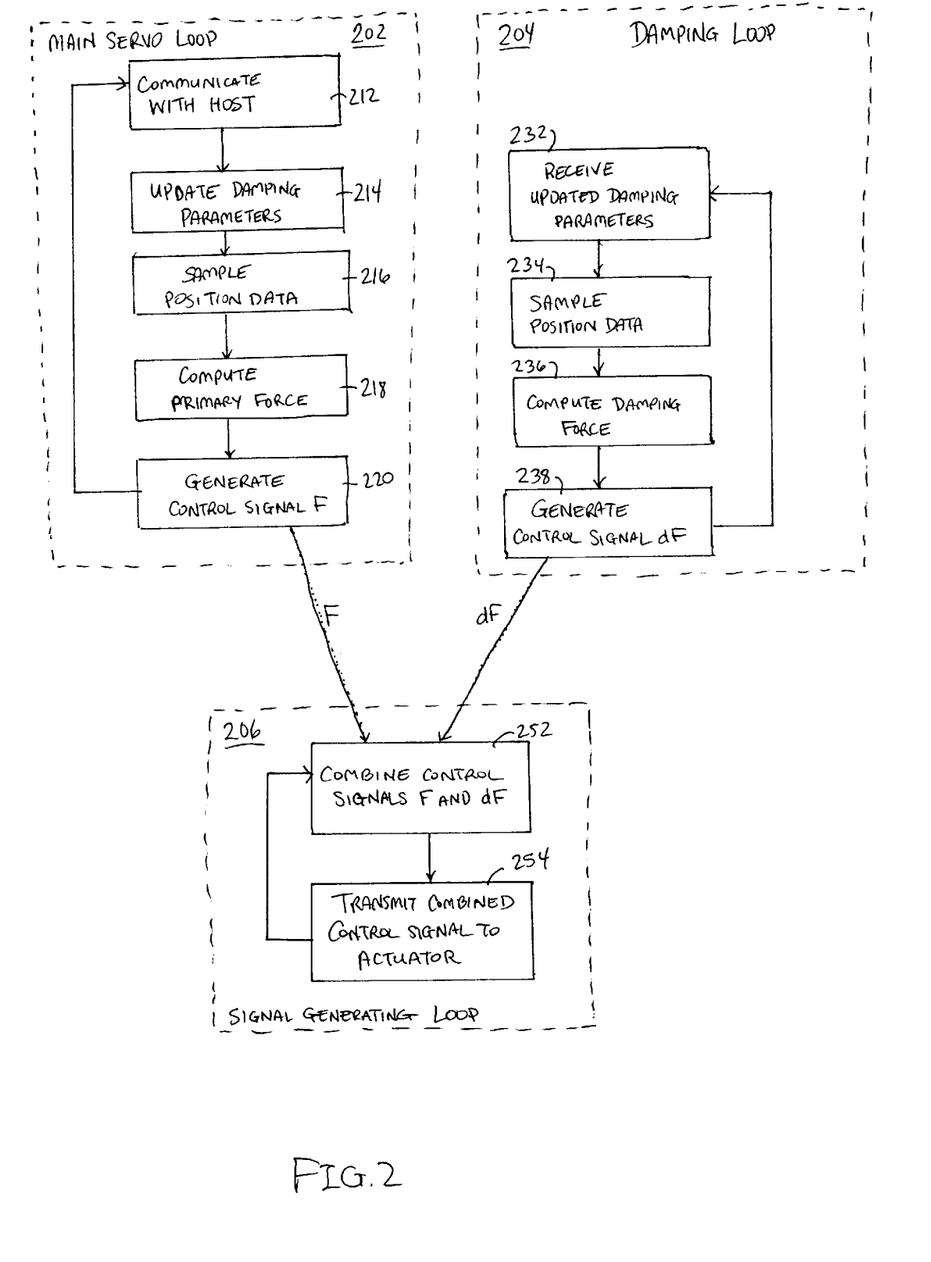
FIG. 2 is a flow chart illustrating a process for generating an actuator control signal according to an embodiment of the present invention.

FIG. 2 is a flow chart showing an example of the operation of haptic control device 100. Main servo loop 202 is performed by local processor 26; damping loop 204 is performed by damping circuit 118; and signal generating loop 206 is performed by combining circuit 120.

In main servo loop 202, local processor 26 computes a force to be applied to the manipulandum, communicates with the host, and performs various other functions generally associated with haptic devices. At step 212, local processor 26 communicates with host 12. This communication can include initialization or updating of various haptic parameters to be used by local processor 26, reporting of manipulandum position and/or velocity data to host 12, and so on. (In embodiments without host 12, this step may be replaced with a step in which local processor 26 generates or otherwise obtains the necessary data.) At step 214, local processor 26 communicates updated damping parameters to damping circuit 118. This may involve, e.g., updating appropriate registers in the damping circuit if the position or spring constant of the wall changes. At step 216, local processor 26 samples the encoder signal to determine a current manipulandum position. At step 218, local processor 26 computes a new primary force based on the current manipulandum position and the haptic parameters obtained at step 214. At step 220, a control signal F corresponding to the computed force is generated and provided to combining circuit 120.

The various actions included in main servo loop 202 can be implemented using conventional techniques. Main servo loop 202 may also include other actions not described herein but known to those of skill in the art. In one embodiment, local processor 26 executes main servo loop 202 at a substantially constant rate (e.g., 1 kHz).

In damping loop 204, damping circuit 118 computes a secondary force to be applied. At step 232, updated damping parameters are received from local processor 26. At step 234, the encoder signal is sampled to determine a current manipulandum position. In one embodiment, damping circuit 118 receives the same encoder data as local processor 26 so that the determined manipulandum position is updated at the main servo rate. In an alternative embodiment, damping circuit 118 independently samples the encoder data and can update the manipulandum position at a rate higher than the main servo rate. At step 236, damping circuit 118 computes a secondary force based on the manipulandum position and the damping parameters obtained at step 232. Examples of methods for computing a secondary force will be described below. At step 238, a corresponding control signal dF is generated and provided to combining circuit 120.

Damping circuit 118 is not required to operate at the main servo rate; in one embodiment, damping loop 204 is executed at a substantially higher rate (e.g., if the main servo rate is 1 kHz, a damping loop rate of 24 kHz can be used). In the case where a higher damping rate is used, step 232 need not occur on every iteration of damping loop 204. Step 232 can be implemented to include counting iterations of damping loop 204 and checking for updated parameters only after a set number of iterations, or periodically sampling a signal from local processor 26 that indicates whether updates are available. Other techniques for managing the transfer of damping parameters can also be implemented.

In signal generating loop 206, combining circuit 120 generates a control signal for actuator 30. Combining circuit 120 receives control signals F and dF corresponding to the primary force and the secondary force, respectively. At step 252, combining circuit 120 combines the control signals, as described above, so that the combined signal corresponds to a superposition of the two forces. At step 254, the combined signal is transmitted to actuator 30. Signal generating loop 206 is advantageously executed at the same rate as damping loop 204. For efficiency, the loop rates should be such that each value resulting from the main servo loop and the damping loop is used by the signal generating loop, but this is not required.

Figure 3:
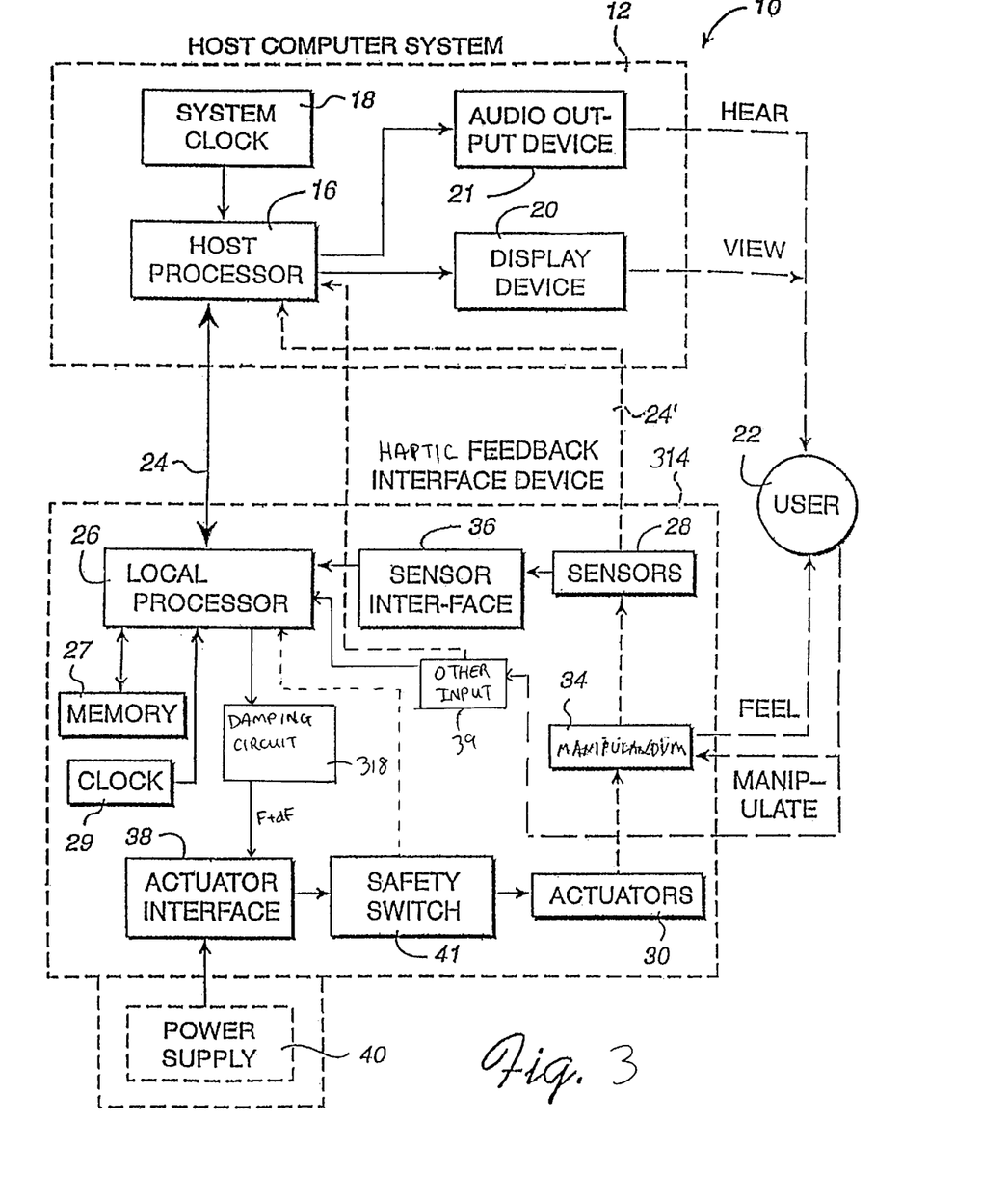
FIG. 3 is a simplified block diagram of a system including a haptic control device according to a second embodiment of the present invention.

FIG. 3 is a simplified block diagram of a second embodiment of an architecture for a haptic feedback device 314 according to the present invention. Haptic feedback device 314 is generally similar to haptic feedback device 14 described above, except that a discrete combining circuit 120 is not provided. Instead, damping circuit 318 receives the primary force control signal F from local processor 26 and uses that signal to compute a net force to be applied, where the net force includes a secondary force computed by damping circuit 318. Damping circuit 318 then provides a corresponding control signal (F+dF) to actuator 30. The operation of haptic feedback device 314 is substantially similar to the process described above with reference to FIG. 2, except that the steps of signal generating loop 206 are merged into damping loop 204.

Figure 4:
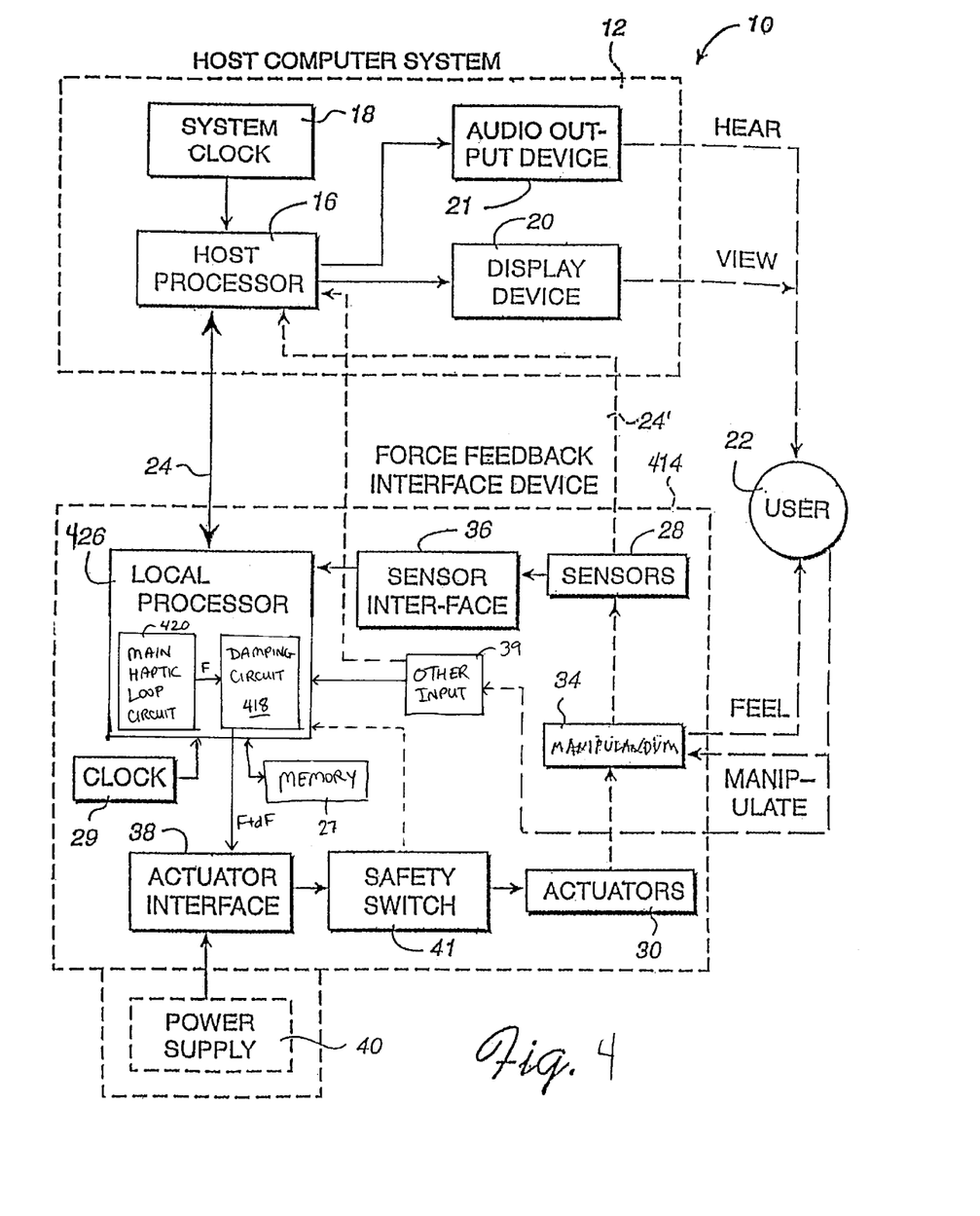
FIG. 4 is a simplified block diagram of a system including a haptic control device according to a third embodiment of the present invention.

FIG. 4 is a simplified block diagram of a third embodiment of an architecture for a haptic feedback device 414 according to the present invention. Haptic feedback device 414 is generally similar to haptic feedback device 314, except that damping circuit 418 is integrated into the local processor 426, together with main haptic loop circuitry 420. The operation of haptic feedback device 400 is substantially similar to the process described above with reference to FIG. 2.

It is to be appreciated that the architectures described herein are illustrative and that variations and modifications are possible. The local processor can be implemented using any control processor, e.g., an ASIC, a general-purpose microprocessor, or other circuits. In some embodiments, the local processor can operate in standalone mode; where a host is provided, the host may be any computer or other higher-level processor. Communication between the host and the local processor may be via Universal Serial Bus, Controller Area Network (CAN) Bus, or other communication means. The damping circuit (and the combining circuit, where a discrete combining circuit is provided) can be implemented as a hard-wired digital circuit with parameters settable by the processor; for instance, the damping circuit can be implemented using a microprocessor, a complex programmable logic device (CPLD), a field programmable gate array (FPGA), or an ASIC. The functionality of the local processor, damping circuit, and combining circuit can be integrated on a single chip or distributed among multiple discrete components in any manner.

Examples of algorithms that can be implemented in damping circuit 118 (or 318 or 418) for computing a secondary force to be applied to manipulandum 104 will now be described. In these examples, manipulandum 104 is a control knob or other device with one rotational degree of freedom, and reference is made to damping torques or secondary torques. It is to be understood that similar algorithms can be used to compute secondary forces for devices with one translational degree of freedom. The algorithms can also be extended to systems with multiple degrees of freedom, as described below.

Figure 5:
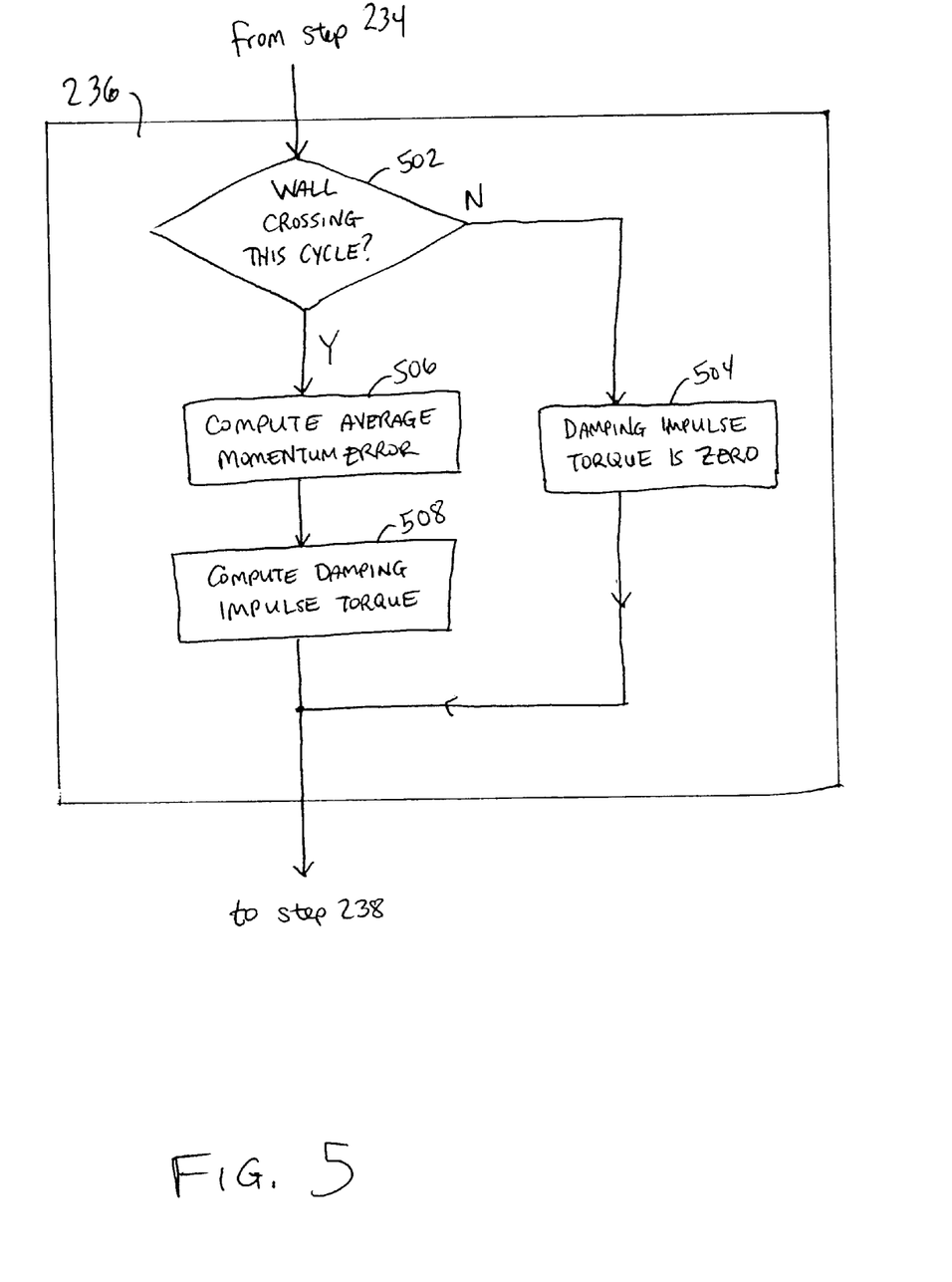
FIG. 5 is a flow chart illustrating a process for computing a secondary force according to an embodiment of the present invention.

FIG. 5 illustrates an embodiment of an impulse-damping algorithm that can be applied at step 236 of damping loop 204. In this embodiment, a secondary torque is applied during the first damping loop cycle after a crossing of the wall boundary is detected. The magnitude and duration of the secondary torque preferably compensates for an error in momentum of the knob due to the delay in updating the force F in the main haptic loop.

At step 502, it is determined from the current manipulandum position whether a wall crossing has occurred. In one implementation, the current position is compared to the wall position (in encoder counts); a value of "1" for the comparison indicates the manipulandum is outside the wall, and a value of "0" indicates that the manipulandum is inside the wall. The result (1 or 0) for the previous iteration of damping loop 204 is stored so that the result for the current iteration can be compared to the result from the previous iteration; a change indicates that the manipulandum has crossed the wall position. If no wall crossing is detected, then at step 504, the secondary torque is set to zero.

If a wall crossing is detected at step 502, then at step 508, the net (angular) momentum error due to the delay in updating the force F in the main haptic loop is computed. In general, the net momentum error is the time integral of the torque ($T_{error}$) representing the wall over the fraction of the sampling period that the manipulandum spends on the "wrong" side of the wall:

$$\int \tau_{error} dt = Kd\theta \Delta t, \quad (1)$$

where K is the spring constant of the wall, dθ is the angular resolution of the encoder, and Δt is the difference between the actual crossing time (i.e., the time at which the manipulandum crosses the wall position) and the next sampling time.

In one embodiment, an average value of Δt is used. On average, the distribution of actual crossing times is uniform, and thus on average $\Delta t = t_s/2$, where $t_s$ is the sampling period. Accordingly, the average momentum error at each wall crossing is:

$$\int \tau_{error} dt = Kd\theta \frac{t_s}{2}. \quad (2)$$

One embodiment of the present invention uses this average as the net momentum error at step 508.

At step 510, the secondary torque ($\tau_D$) is computed. In one embodiment, the secondary torque is applied for one cycle of the damping loop and imparts a net momentum to offset the momentum error computed using equation (2). Thus, the secondary torque is:

$$\tau_D = Kd\theta \frac{t_s/2}{t_D}, \quad (3)$$

where $t_D$ is the period of the damping loop. As described above, a control signal corresponding to secondary torque $\tau_D$ is generated and combined with the control signal corresponding to the primary force.

In one embodiment, the position of the manipulandum is determined at the main servo rate, and $t_s$ is the main loop period. In other embodiments, the position of the manipulandum is determined for damping loop 204 at a higher rate than the main servo, and the appropriate value of $t_s$ is used in equation (3).

Figure 6:
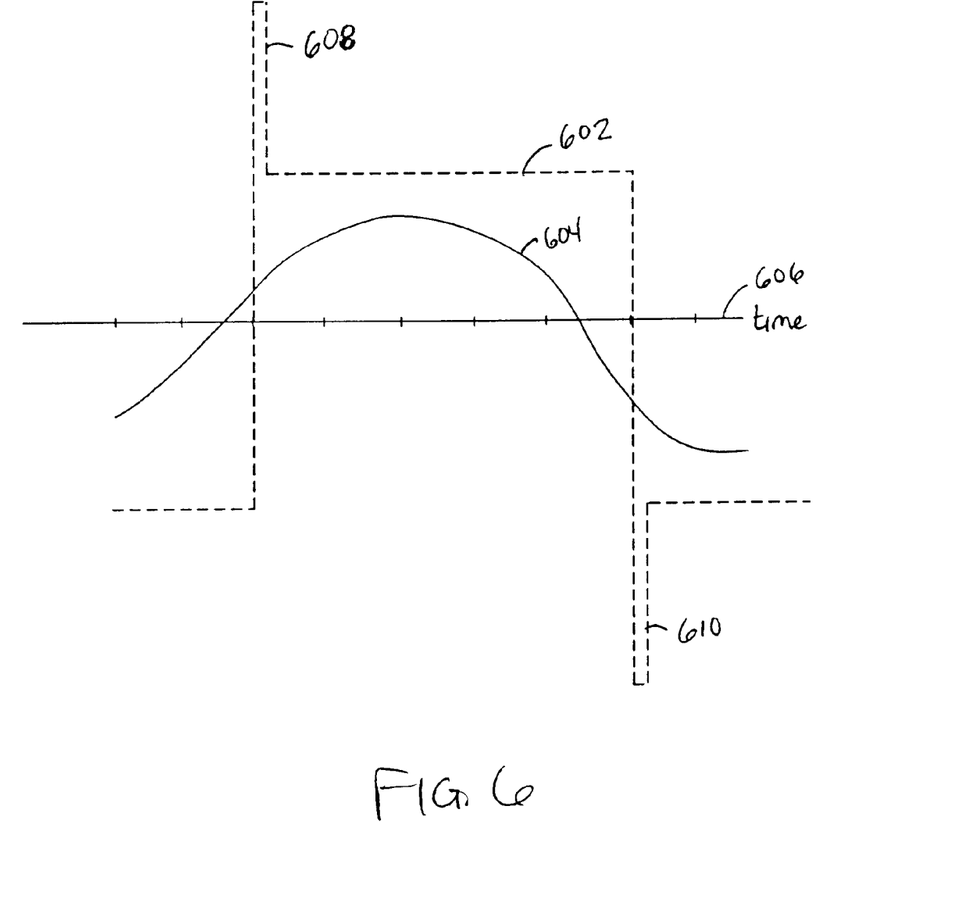
FIG. 6 is a graph showing manipulandum position and haptic feedback force as a function of time according to an embodiment of the present invention.

FIG. 6 is a graph representing the total torque applied to a haptic control knob as a function of time in an impulse damping embodiment. Dotted line 602 represents the total torque (with a sign reversal), and solid line 604 represents the actual position of the knob. The tick marks along time axis 606 indicate the sampling period $t_s$. Impulse torques 608, 610 are applied at the beginning of the first sample interval after the threshold crossing and lasts for one cycle ($t_D$) of the damping loop. In this case, $t_D$ is less than $t_s$. Although the torques are symmetric about zero, in some embodiments, this need not be the case.

Figure 7A:
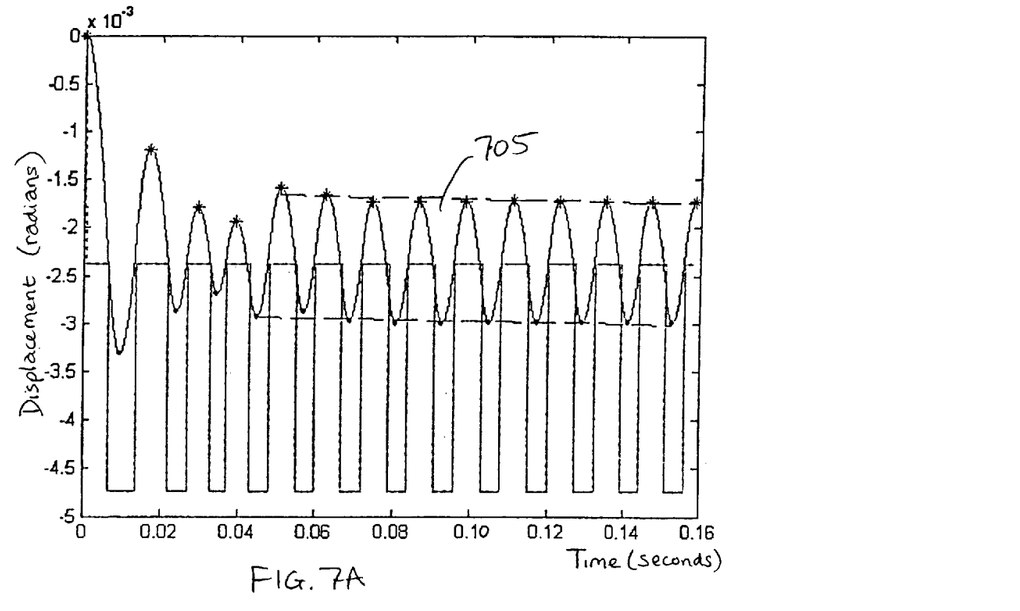
FIGS. 7A–B are graphs showing simulations of manipulandum position as a function of time in a conventional system and a system according to an embodiment of the present invention, respectively.
Figure 7B:
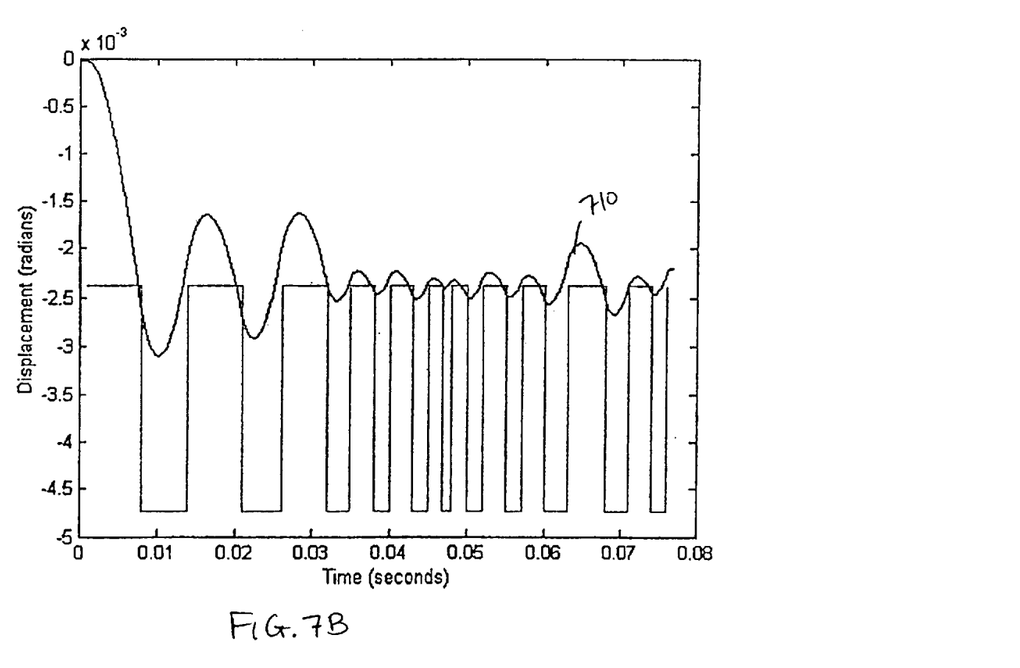

FIGS. 7A–B illustrate the effect of impulse damping in a simulated haptic knob with a main loop rate of 1 kHz and an encoder resolution of 2650 counts/revolution. In each graph, the curve represents the position trajectory of the haptic knob, and the pulses represent the torque command stream sent to the actuator. FIG. 7A illustrates the behavior of the haptic device in contact with a virtual wall with no secondary torque. Limit cycle oscillations occur in region 705. In FIG. 7B, an impulse secondary torque is applied at the beginning of the next sampling period after detection of a threshold crossing (e.g., at about time t=0.06 sec), and the damping impulse period is 1/40 of the sampling period. In general, the amplitude of the oscillations is significantly reduced, but, occasionally, there are larger pulses (e.g., pulse 710). These larger pulses occur when the actual wall crossing occurs just after a sample instant, so that the actual momentum error was $K*d\theta*t_s$ rather than the assumed $K*d\theta*t_s/2$ of equation (2). In this case, the impulse torque under-corrects the momentum, allowing the knob to penetrate farther beyond the wall boundary. These worst case pulses can be perceptible to a user grasping the manipulandum.

It is to be understood that the impulse damping process is illustrative and not restrictive. The sample period $t_s$ need not correspond to the main loop period and can be as small as desired. In addition, a value other than $t_s/2$ can be used for difference between actual crossing time and sampling time (Δt).

Figure 8:
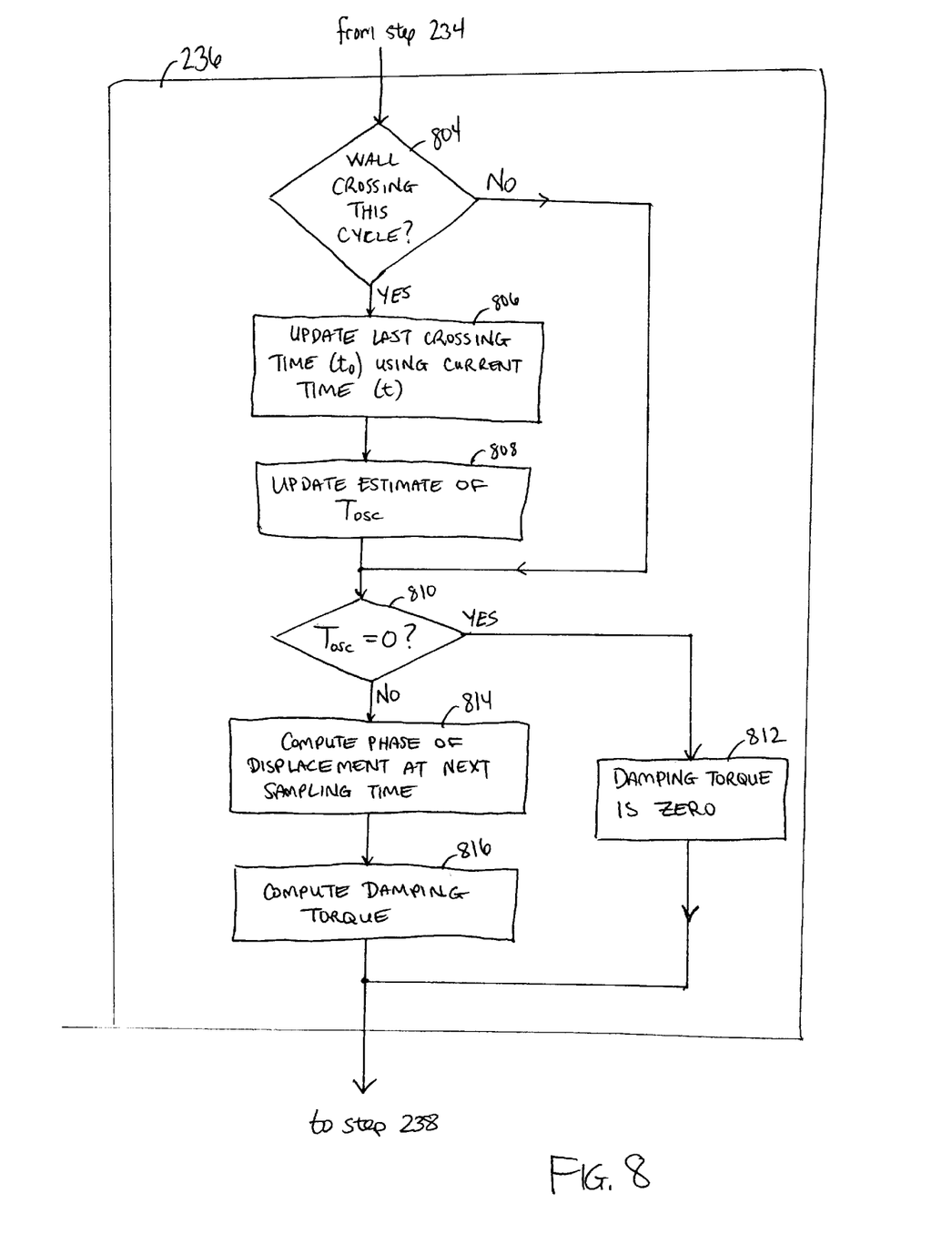
FIG. 8 is a flow chart illustrating a process for computing a secondary force according to an alternative embodiment of the present invention.

FIG. 8 illustrates an embodiment of a phase estimation damping algorithm that can be applied at step 236 of damping loop 204. In this embodiment, when an oscillation of the manipulandum is detected, a periodic secondary torque with a constant phase offset relative to the manipulandum position is provided, regardless of the source of oscillation energy, thereby reducing oscillation magnitude without necessarily increasing oscillation frequency. For fairly regular limit cycle oscillation waveforms, accurate information as to wall crossing times enables a reliable estimation of the phase of the oscillations, even in the absence of reliable position or velocity information. Using the phase estimate, a force or torque out of phase with the velocity is generated to provide damping.

At step 804, it is determined whether a wall crossing has occurred; this step may be similar to step 502 described above. If a wall crossing is detected, then the time of the last wall crossing ($t_0$) is set to the current time (t) at step 806. The current time may be measured in damping loop cycles or in any other convenient unit. At step 808, the new value of $t_0$ is used as a data point to update an estimate of the oscillation period $T_{osc}$. In one embodiment, the oscillation period is assumed to be constant (or only slowly varying), and $T_{osc}$ is equal to twice the interval between the two most recent wall crossing times. If oscillations have not yet begun (i.e., there have not been at least two wall crossings detected within some cutoff time), then $T_{osc}$ can be set to zero, indicating that no secondary torque is to be applied.

At step 810, it is determined whether $T_{osc}$ is zero. If so, then the secondary torque $\tau_D$ is set to zero at step 812. If $T_{osc}$ is not zero, then oscillations have been detected and a secondary torque is computed according to steps 814 and 816. Specifically, at step 814, an estimated phase of the displacement is computed for the next sampling time. The sampling interval in this case is the damping loop period $t_D$, and the phase $\phi$ is $(t+t_D-t_0)/T_{osc}$ for a nonzero $T_{osc}$. In this embodiment, the phase at the next damping loop cycle, rather than the current cycle, is of interest because a torque computed in one cycle of the damping loop is applied in the following cycle. If $T_{osc}$ is zero, then no phase is computed.

At step 816, an updated secondary torque is computed as $$\tau_D = -B \cos 2\pi\phi, \quad (4)$$

where B is a scaling factor optimized for a particular haptic system. If $T_{osc}$ is zero, the secondary torque is also set to zero. As described above, a control signal corresponding to secondary torque $\tau_D$ is generated and combined with the control signal corresponding to the primary force.

Figure 9:
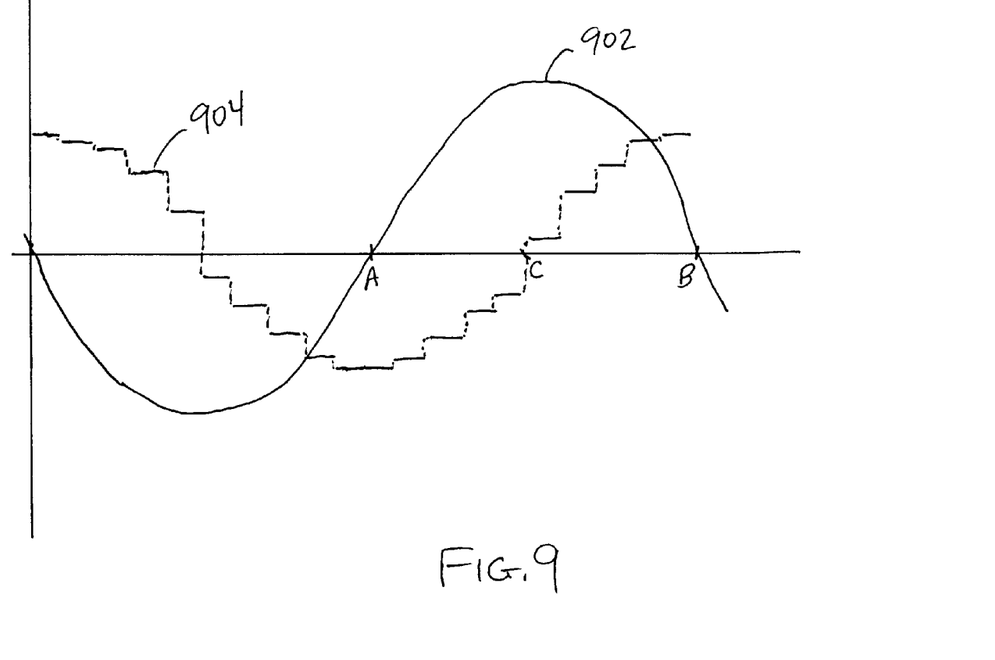
FIG. 9 is a graph showing manipulandum position and haptic feedback force as a function of time according to an alternative embodiment of the present invention.

FIG. 9 is a graph showing the manipulandum position (solid line 902) and secondary torque (dashed line 904) as a function of time during an oscillation. It can be seen that the secondary torque is maximized when velocity is also at a maximum, i.e., when the manipulandum crosses the wall position (e.g., times A and B). Near the wall crossing, knowledge of the manipulandum position is most accurate, and the maximum torque will reliably be applied in the correct direction to damp the oscillation. The secondary torque decreases sinusoidally as the manipulandum moves away from the wall position and toward the direction reversal point (e.g., time C). Phase estimation errors near time C can result in a torque being applied to accelerate the manipulandum rather than decelerate it; however, near time C, the secondary torque is relatively weak. Thus, the effect of the phase error is minimal.

As described above, $T_{osc}$ can be computed using only the last two wall crossing times if the oscillation period is assumed to be constant (or slowly varying). In some applications, due to the secondary torque, the oscillation period is generally not constant. To account for variations in the oscillation period, more sophisticated techniques for computing $T_{osc}$ can be applied, such as Kalman filtering or adaptive control methods. In view of the present disclosure, implementation of such techniques will be straightforward to one of ordinary skill in the art.

It is to be understood that the phase-estimation damping process is illustrative and not restrictive. The damping loop period can be varied, and wall crossings can be detected at the damping loop period, the main loop period, or any other period, with shorter periods producing more reliable data. The scaling factor B can be determined in various ways.

In addition, it should be noted that the phase estimation damping method can be applied to reduce oscillations of the manipulandum in a variety of situations, including instances where the oscillations are not caused by a virtual wall. Oscillations can be detected and a secondary force applied whenever the manipulandum crosses a "zero" position multiple times within some specified maximum time interval. The number of zero crossings required to initiate oscillations and the maximum interval between zero crossings can be varied. The zero position can be located at any manipulandum position and need not correspond to any particular encoder count.

Although the foregoing description contemplates a haptic manipulandum with a single degree of freedom, a similar technique can be implemented for a manipulandum with multiple degrees of freedom. Embodiments with multiple degrees of freedom will now be described.

In some devices with multiple degrees of freedom, the degrees of freedom are substantially decoupled (e.g., a conventional haptic joystick with a spherical five-bar linkage). In this case, secondary torques can be computed and applied independently in each degree of freedom, using techniques similar to those described above. A separate damping circuit can be provided for each degree of freedom, or circuits for different degrees of freedom can share components.

In other devices, such as robotic arms with multiple joints, the degrees of freedom are coupled. For such devices, well-known kinematic calculations are required to convert joint-space displacements to Cartesian displacements (e.g., the position of a robotic hand at the end of a robotic arm), and inverse Jacobian calculations are required to convert Cartesian forces and torques to joint-space torques. The kinematic parameters and inverse Jacobian coefficients can change as different joints of the device move into various positions. Calculations of the kinematic parameters and the inverse Jacobian coefficients are conventionally performed at the main servo rate and used to compute haptic forces to be applied to each joint. Such calculations often consume a significant fraction of processor resources, limiting the main haptic loop rate.

The damping techniques of the present invention can nevertheless be applied to such systems because, at velocities common in haptic feedback applications, kinematic parameters and Jacobian coefficients generally do not change significantly over times comparable to main loop or damping loop cycles. Accordingly, a separate damping circuit can be provided for each degree of freedom (e.g., each joint of the robotic arm). Each circuit calculates secondary forces (or torques) for its joint at a high damping loop rate (e.g., around 24 or 48 kHz) using algorithms such as those described above. Where kinematic parameters and inverse Jacobian coefficients are required for computing a secondary force, the damping circuit uses values computed by the local processor at the main loop rate and provided to the damping circuit at that rate.

Thus, according to the present invention, limit cycle oscillations in haptic control devices with displacement quantization can be reduced without increasing the resolution of the encoder or the main haptic loop rate, by providing a dedicated damping circuit that can operate at a higher rate. The damping circuit provides a secondary force that is added to the force computed in the main haptic loop. It should be noted that the techniques of the present invention are effective as long as the sampling interval for the damping loop is substantially shorter than the oscillation period (e.g., by a factor of 10). Under these conditions, although the encoder resolution contributes more significantly than the sampling rate to limit cycle oscillations, the methods described herein can be used to reduce oscillations without increasing the encoder resolution.

While the invention has been described with respect to specific embodiments, one skilled in the art will recognize that numerous modifications are possible. The damping loop can be implemented in hardware, as described above, or in control software operating in the local processor or a remote host. The damping loop rate can be equal to the main haptic loop rate or greater than the main haptic loop rate. The secondary force to be applied can be computed using the algorithms described above or variations thereof. Damping circuits can be implemented in any kind of haptic control device, with any number of degrees of freedom, not limited to the particular examples mentioned herein.

Thus, although the invention has been described with respect to specific embodiments, it will be appreciated that the invention is intended to cover all modifications and equivalents within the scope of the following claims.

What is claimed is:

1. In a haptic device having a manipulandum, wherein a position of the manipulandum is determined at regular sampling times, a method for reducing limit cycle oscillations of the manipulandum, comprising:

in a first servo loop operating at a first servo rate, determining a primary force based on the position of the manipulandum at a current sampling time;

in a second servo loop operating at a second servo rate: detecting an oscillation of the manipulandum; and determining a secondary force in response to the oscillation;

combining the primary force and the secondary force; and applying the combined force to the manipulandum.

2. The method of claim 1, wherein the first servo rate is slower than the second servo rate.

3. The method of claim 1, wherein detecting an oscillation includes detecting a crossing of a virtual wall position by the manipulandum.

4. The method of claim 3, wherein determining a secondary force includes:

computing a momentum error associated with the crossing of the virtual wall position; and computing a secondary force offsetting the momentum error.

5. The method of claim 4, wherein computing a momentum error associated with the crossing includes:

computing an applicable force for a position inside the virtual wall region;

computing an error time corresponding to a time spent inside the virtual wall region before the applicable force is applied; and multiplying the applicable force by the error time.

6. The method of claim 5, wherein computing an applicable force for a position inside the virtual wall region includes:

computing the product of a spring constant associated with the virtual wall times a displacement resolution associated with the position of the manipulandum.

7. The method of claim 5, wherein computing an error time includes:

setting the error time equal to half an interval between sampling times.

8. The method of claim 4, wherein computing a secondary force offsetting the momentum error includes:

dividing the momentum error by a period of the second servo loop.

9. The method of claim 1, wherein detecting an oscillation includes detecting at least two crossings of a zero position by the manipulandum within a predetermined time interval.

10. The method of claim 9, wherein determining a secondary force in response to the oscillation includes:

computing a period of the oscillation;

identifying a last zero crossing time;

computing a displacement phase of a periodic displacement function based on the oscillation period and the last zero crossing time;

computing a secondary force from the displacement phase, the secondary force having a damping phase offset from the displacement phase by a constant offset.

11. The method of claim 10, wherein computing an oscillation period includes:

identifying two successive zero crossing times; and computing an oscillation period equal to twice the difference between the two successive zero crossing times.

12. The method of claim 9, wherein the zero position corresponds to a position of a virtual wall.

13. A control system for a haptic device having a manipulandum, comprising:

a processor configured to generate a primary force signal at a main haptic loop rate;

a damping circuit configured to detect an oscillation of the manipulandum and to generate a secondary force signal at a damping loop rate in response to the detected oscillation; and a combining circuit configured to combine the primary force signal and the secondary force signal, thereby generating a control signal for controlling a haptic feedback force of the haptic device.

14. The control system of claim 13, wherein the main loop rate is slower than the damping loop rate.

15. The control system of claim 13, wherein the damping circuit is further configured to detect an oscillation of the manipulandum by detecting a crossing of a virtual wall position by the manipulandum.

16. The control system of claim 15, wherein the damping circuit is further configured to compute a momentum error associated with the crossing of the virtual wall position and to compute a secondary force offsetting the momentum error.

17. The control system of claim 16, wherein the momentum error is equal to the product of a spring constant associated with the virtual wall times a displacement resolution associated with the manipulandum times half a time interval between successive determinations of the manipulandum position.

18. The control system of claim 16, wherein the secondary force is substantially equal to the momentum error divided by a period of the damping loop.

19. The control system of claim 13, wherein the damping circuit is further configured to detect an oscillation of the manipulandum by detecting at least two crossings of a zero position by the manipulandum within a predetermined time interval.

20. The control system of claim 19, wherein the damping circuit is further configured to compute a periodic secondary force having a phase offset from an estimated phase of the detected oscillation.

21. The control system of claim 20, wherein the estimated phase of the detected oscillation is substantially equal to the quotient of the difference between a current time and a last zero-crossing time divided by an estimated period of the detected oscillation.

22. The control system of claim 21, wherein the estimated period of the detected oscillation is substantially equal to twice the difference between two successive zero-crossing times.

23. A haptic feedback device, comprising:

a manipulandum;

an actuator coupled to the manipulandum and configured to exert a force on the manipulandum in response to an actuator control signal;

a processor configured to generate a primary force signal at a main haptic loop rate;

a damping circuit configured to detect an oscillation of the manipulandum and to generate a secondary force signal in response to the detected oscillation; and a combining circuit configured to combine the primary force signal and the secondary force signal, thereby generating the actuator control signal.

24. The haptic feedback device of claim 23, wherein the main loop rate is slower than the damping loop rate.

25. The haptic feedback device of claim 23, wherein the damping circuit is further configured to detect an oscillation of the manipulandum by detecting a crossing of a virtual wall position by the manipulandum.

26. The haptic feedback device of claim 25, wherein the damping circuit is further configured to compute a momentum error associated with the crossing of the virtual wall position and to compute a secondary force offsetting the momentum error.

27. The haptic feedback device of claim 26, wherein the momentum error is equal to the product of a spring constant associated with the virtual wall times a displacement resolution associated with the manipulandum times half a time interval between successive determinations of the manipulandum position.

28. The haptic feedback device of claim 26, wherein the secondary force is substantially equal to the momentum error divided by a period of the damping loop.

29. The haptic feedback device of claim 23, wherein the damping circuit is further configured to detect an oscillation of the manipulandum by detecting at least two crossings of a zero position by the manipulandum within a predetermined time interval.

30. The haptic feedback device of claim 29, wherein the damping circuit is further configured to compute a periodic secondary force having a phase offset from an estimated phase of the detected oscillation.

\* \* \* \* \*